United States Patent [19]
Burkett et al.

[11] 3,887,858
[45] June 3, 1975

[54] BATTERY CHARGING

[75] Inventors: Wilford B. Burkett, Pacific Palisades; George D. Carlsen, II, Venice, both of Calif.

[73] Assignee: McCulloch Corporation, Los Angeles, Calif.

[22] Filed: June 14, 1973

[21] Appl. No.: 370,007

Related U.S. Application Data

[63] Continuation of Ser. No. 240,137, March 31, 1972, abandoned.

[52] U.S. Cl. ........................ 320/31; 320/37; 320/39
[51] Int. Cl. ............................................. H02j 7/04
[58] Field of Search ............ 320/22, 23, 20, 32, 31, 320/37, 38, 39, 40, 15, 34, 46, 30

[56] References Cited
UNITED STATES PATENTS

| | | | |
|---|---|---|---|
| 3,090,904 | 5/1963 | Jensen | 320/22 |
| 3,230,439 | 1/1966 | Sobel | 320/30 |
| 3,329,882 | 7/1967 | Sobel | 320/39 |

*Primary Examiner*—J. D. Miller
*Assistant Examiner*—Robert J. Hickey
*Attorney, Agent, or Firm*—Christie, Parker & Hale

[57] ABSTRACT

A method and circuitry for high rate charging of batteries, and particularly lead acid batteries, involves high rate charging beyond the hard gas point of the battery for a fixed interval of time. The high rate charge current which may advantageously be in excess of the nominal rate of discharge employed by the manufacturer in rating the battery may be held substantially constant during charge. A characteristic of the battery is monitored during charge and upon the attainment of a preselected level of the monitored characteristic, a timed interval is begun during which the high rate charge is continued and at the end of which the high rate charge is terminated. Advantageously, a preselected percentage, such as 25%, of the energy stored in the battery before the timed interval is begun is put into the battery during this timed interval as overcharge. The circuitry includes a controllable switch and a current sensor for controlling the charging current level. A silicon controlled rectifier may be phase angle controlled in response to the output of the current sensor from essentially 0°–180° of one or both half-cycles from an alternating-current source. Alternatively, the duty cycle of a transistor switch may be controlled in response to the output of the current sensor to maintain the desired current level.

6 Claims, 11 Drawing Figures

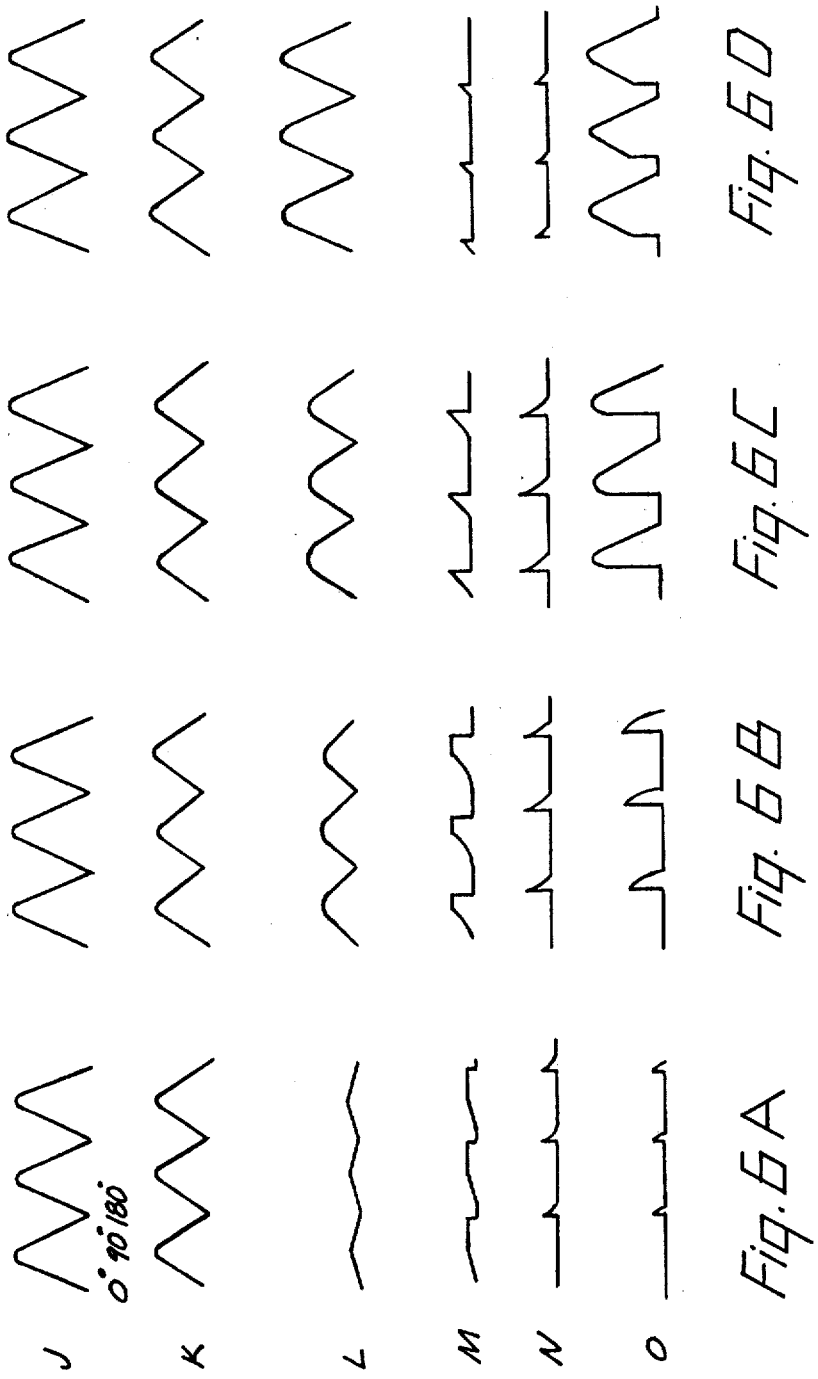

3,887,858

BATTERY CHARGING

RELATED APPLICATION

This application is a continuation of U.S. Ser. No. 240,137, filed Mar. 31, 1972, and now abandoned.

BACKGROUND OF THE INVENTION

1. Field of the Invention

This invention relates to a method and circuitry for charging batteries and is particularly adapted to the complete charging of lead acid batteries in a relatively short period of time. Storage batteries may be recharged to varying degrees in various time intervals by many different methods and circuitries. However, there are practical limitations on the time it takes to change a storage battery. Consider, for example, a lead acid battery designed to supply the power to operate a golf cart. Such a battery is typically rated by the different manufacturers to have a capacity between 190–220 ampere hours. The rating is established by determining the quantity of electricity that the battery is able to deliver by discharging the battery at a known rate until the battery terminal voltage reaches a selected end voltage while operating within a selected temperature range. The capacity rating of the battery is generally stated in ampere-hours for a particular interval of discharge. For example, the golf cart battery's capacity is generally stated for the 20-hour rate of discharge. Thus, the 20-hour rate for a 220 ampere hour 36-volt battery designed for golf cart use is 11 amperes.

2. Description of the Prior Art

Chargers are available that will apply a charging current in excess of the battery's nominal rate employed by the manufacturer in rating the battery. These chargers include booster charges, taper chargers, constant current chargers, and constant voltage chargers. The booster charges are typically designed to provide a high rate charge for a short interval of time with a reduced rate thereafter.

Taper charges, on the other hand, employ a high rate charge until a monitored characteristic of the battery, such as terminal voltage or gassing, reaches a selected level and then the charge rate is substantially reduced. A common practice in such chargers is to continually decrease the charge rate after the selected level of the monitored characteristic is attained to provide the taper charge.

Generally, these chargers do not provide a 100-percent charge with the high rate charge but employ an extended application of a lower charge rate in an attempt to replace all of the energy that has been removed from the battery. However, most battery chargers do not replace 100-percent of the energy removed, and those that do are either relatively expensive or require an excessive amount of time.

A battery in a golf cart may have only a 12-hour period in which to complete a charge program. Similarly batteries powering industrial trucks, fork lifts, and floor sweepers may have only a limited period in which to be charged. Some chargers may charge the battery in this limited time, but they do not leave any time for the application of a trickle charge. It is known that a trickle charge has beneficial effects such as balancing the cells of a battery and it is therefore desirable that a charge program include a period of tricke charge.

Additionally, when charging lead acid batteries, there is a possibility of damage to the plates when employing some of the commercial chargers because of the differing degrees of acidity of the electrolyte at the top surface of the electrolyte and the bottom of the electrolyte.

For example, the electrolyte in an automotive battery typically has a specific gravity between 1.260–1.280 when fully charged. At the end of charge by a taper charger, it has been found that the specific gravity of the electrolyte is 1.220 near the surface of the electrolyte. After mixing the electrolyte so that the electrolyte at the top surface and at the bottom of the battery are mixed, the specific gravity measures 1.270 near the surface. Thus, the specific gravity at the bottom of the battery must be well in excess of 1.270 during charging.

It is known that any specific gravity in excess of 1.300 may substantially damage the battery by destroying the separators and the positive grid material and by causing sulfation or inactivation of the negative plate material. See page 130 of the text entitled, "Storage Batteries," John Wiley and Sons, Inc., 4th Edition, by Vinal. The excessively high specific gravity that is present at the bottom of the battery when charging with many of the commercial chargers designed for charging lead acid batteries has been avoided in some chargers by bubbling air through the electrolyte during charging to mix the electrolyte. However, this requires additional equipment that substantially increases the cost of the charger.

SUMMARY OF THE INVENTION

The disadvantages of incomplete charging, lack of time for trickle charge, and excessively high specific gravity electrolyte near the separator and plates at the bottom of the cells during charging are overcome by the method and circuitry for charging of the present invention.

Batteries are charged in accordance with this invention by applying a charging current during a first interval of time, monitoring a characteristic of the battery that changes as charge progresses, and upon the attainment of a preselected level of the monitored characteristic continuing the application of charging current for a second interval of time. The second interval of time may be preselected to provide a desired overcharge or may be variable and dependent upon the duration of the first interval. Advantageously, the charge rate during the second interval of time is sufficient to cause mixing of the electrolyte by the generated gas. Further, in accordance with the method of this invention, the preselected level of the monitored characteristic may advantageously be the hard gassing point for the battery and the charge rate thereafter for the fixed interval of time is at a potential above the decomposition potential of the electrolyte.

At the end of the second interval of time, the battery may advantageously be further charged and balanced by the application of a trickle charge current.

It is desirable to put into the battery an overcharge, such as 25 percent, more energy than was removed during discharge. For this purpose, the initial application of charging current is for an interval of time dependent upon the charge condition of the battery. This interval of time is established by the time it takes to reach the preselected level of the monitored condition. Thereafter, a preselected rate of charge current is applied for a second interval of time related to the first interval of time, which relationship is advantageously one-fourth of the first interval of time, to provide a selected overcharge such as 25 percent.

In order to charge the battery in a reasonable amount of time, the charge rate is advantageously in excess of the nominal discharge rate of the cells of the battery determined by dividing the rated capacity of the battery, as established by the manufacturer, by the stated number of hours of discharge for that rating.

The rate of charge, however, is primarily dictated by the costs of the components and the current source to be employed. For example, when the source is a wall plug, which is fuzed at 15 amperes, and with components in a particular price range and without overheating the components, the charge current is limited to 25 amperes, which is approximately 2½ times the nominal discharge rate for a 220 amp-hour golf cart battery rated for a 20 hour discharge.

The circuit of this invention includes a charge current source coupled to the battery to be charged, circuit means for monitoring a characteristic of the battery that changes as charge progresses, circuit means for generating a control signal at the end of a preselected second interval of time after the attainment of a preselected level of the monitored characteristic during the first charge interval, and circuit means responsive to the control signal for terminating the charging of the battery or for reducing the charge current to a trickle charge level. Alternatively, the second interval may be dependent upon the length of the first interval by including in the charger circuit means for sensing the duration of the first interval and for establishing the length of the second interval.

The charging current source may be a constant current source or a constant voltage source. When employing a constant current source, a switch means may be advantageously connected in the current path between the source and the battery with means for monitoring the charge current level, and means for controlling the conduction state of the switch means in response to the output of the monitoring means to keep the charge current level constant. The switch means may be a transistor switch having its duty cycle controlled in accordance with the variation in the charge current level. Alternatively, the switch means may be a silicon controlled rectifier (hereinafer SCR) that is in response to the charge current level, phase angle controlled between 0°-180° of one or both half-cycles from an alternating-current voltage source.

Advantageously, the control circuit for a switching transistor includes a one-shot multivibrator having an unstable state of variable duration dependent on the charge current level with the unstable state being reduced in duration for charge currents above a preselected level and increased in duration for charge currents below a preselected level with the "ON" time of the switching transistor corresponding to the unstable state of the multivibrator.

The control circuit for the SCR advantageously includes a relaxation oscillator having a unijunction transistor as the active element with a variable resistor in the emitter circuit for controlling the point of firing of the unijunction transistor to control the gating of the SCR. Advantageously, the variable resistor may comprise a transistor circuit that is responsive to the level of the charging current. A circuit for sensing a preselected characteristic of the battery under charge, namely the battery terminal voltage, includes one or more Zener diodes connected in series with a potentiometer. A first SCR is connected to be responsive to a preselected level of the monitored characteristic. The anode of the first SCR is connected through a resistor to the positive side of the battery under charge while the cathode is connected to the negative side, with both being connected to ground reference. The gate of the first SCR is connected to the variable arm of the potentiometer. The base of a transistor switch is connected between the resistor and the anode of the first SCR and is responsive to the conduction state of the first SCR. The transistor switch is closed, i.e., the transistor conducts while the first SCR is nonconductive.

The timed interval of the charge program is dependent upon the duration of the first interval of charge by employing one or more cells that are charged during the first interval. The time of discharge down to a selected voltage then dictates the duration of the second interval with the time of discharge being dependent upon the state of charge, which is dependent upon the duration of the first interval. The cell is connected through the first transistor circuit and a current limiting resistor to the positive side of the battery under charge. The cell is also connected through a blocking diode to the base of another transistor which is biased in its conductive state by the cell under charge and held in this state until the cell voltage decreases below that necessary to forward bias the blocking diode and the transistor. This second transistor is connected between the gate and cathode of a second SCR which is connected in the control circuit of the SCR or switching transistor that controls the application of the charging current to the battery undercharge. The forward biasing of the second SCR when the second interval is terminated by the cell discharging below the level to keep the second transistor conducting, applies ground reference to a point within the relaxation oscillator circuit controlling the control SCR to hold the SCR in the trickle mode. Alternatively, ground reference is applied to a point within the multivibrator to reduce the duration of the unstable state to a trickle mode condition.

The charger is temperature compensated by a thermistor connected between the potentiometer and gate of the first SCR. A resistor is connected between the gate and ground reference to provide a voltage divider in cooperation with the thermistor. The thermistor, which has a negative temperature coefficient, is placed in thermal contact with the Zener diodes, which has a positive temperature coefficient to make the first SCR responsive to a selected voltage independent of the ambient temperature of the charger or battery.

A first manual switch is connected between a voltage source and the gate of the first SCR and a second manual switch, mechanically coupled to the first switch, is connected between a voltage source and the gate of the second SCR so that upon the closing of the switches the charger may be manually placed in the trickle mode.

BRIEF DESCRIPTION OF THE DRAWINGS

The above and other features and advantages of the present invention may be understood more clearly and fully upon consideration of the following specification and drawings, in which:

FIGS. 6A, 6B, 6C and 6D are time-based charts depicting the voltage waveforms at various points in the circuit of FIG. 5 that are useful in an understanding of the operation of the circuit;

DESCRIPTION OF THE PREFERRED EMBODIMENT

Secondary cells or rechargeable cells may be charged by many different methods and by many different battery chargers. The charger may run all the way from relatively inefficient, crude, and inexpensive chargers to very efficient, highly sophisticated and expensive chargers. Charging methods may include the application of DC current for selected intervals of time, the application of pulsating DC current or the more efficient method of intermittent discharging or depolarization during the charging program, as disclosed in U.S. Pat. Nos. 3,517,293, 3,614,583, and 3,609,503. Oftentimes it is desirable to charge batteries from the commercial 110 volt source, available at a wall plug. Also it is desirable that chargers charge a battery in as short a time as possible at a reasonable cost.

The method and circuitry for charging batteries of the present invention has many of these desired characteristics. The method of the present invention involves the application of a charging current to the battery to be charged, which current may be continuous DC or pulsating DC with the charging current being at a sufficient rate to cause the characteristics of the battery that vary during charging to vary and to indicate the state of charge. For example, two of the characteristics that vary during charging of batteries are the gassing of the cells and the terminal voltage of the battery. Gassing will generally begin in a lead acid cell at the decomposition potential of the electrolyte in the cell. The decomposition potential may be defined as that cell voltage at which the water in the electrolyte is broken down or decomposed into hydrogen and oxygen gases. This voltage varies with the different metals employed in the cell. However, for a lead acid cell, the decomposition potential is somewhere between 2.3–2.4 volts per cell. The gassing in lead acid cells is described in the Vinal text at pages 261 through 263.

A significant point in the charging of a lead acid cell is the hard gassing point which may be defined as that cell voltage at which the oxygen and hydrogen are released in stoichiometeric quantities. In a lead acid cell, this voltage is approximately 2.50 volts per cell.

Advantageously, in the method of the present invention, one of the characteristics of the battery is monitored and at the end of a selected interval of time or upon the attainment of a preselected level of the monitored characteristic, a second interval of charge is begun. This second interval of charge may be of fixed duration and at the same charge level as before or it may be above or below that level. Alternatively, the second interval of charge may be directly dependent on the duration of the first interval.

Figure 1:
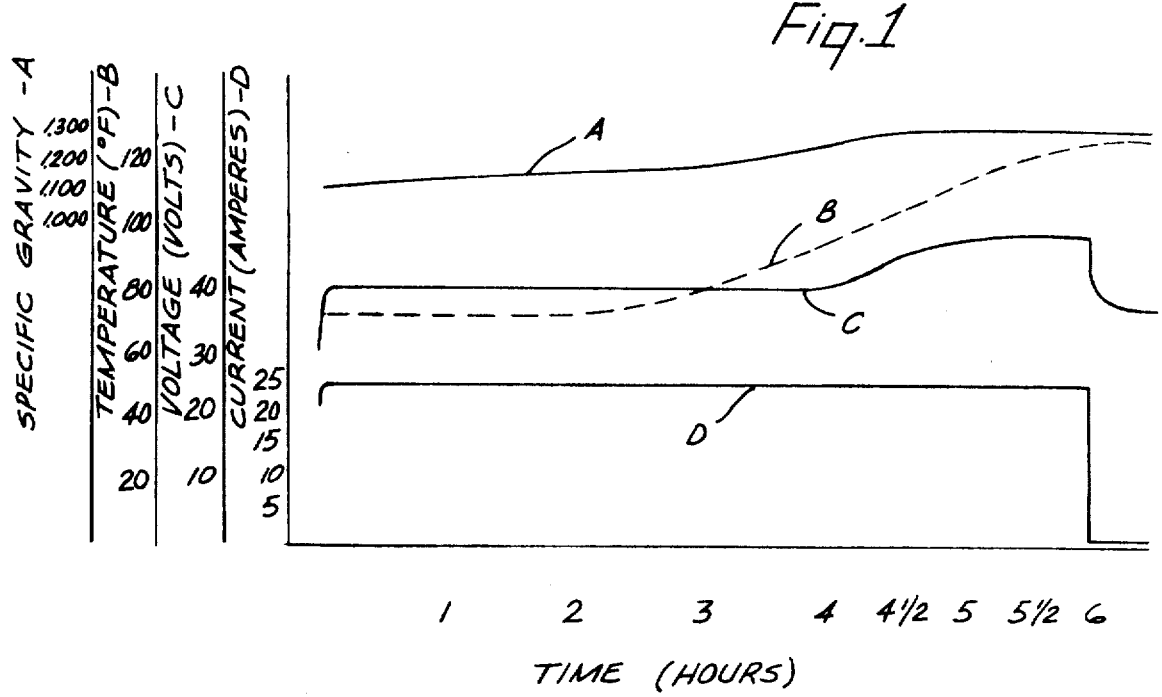
FIG. 1 is a set of curves showing the variation of three of the characteristics of a lead acid battery under charge and a curve of the charging current useful in understanding the present invention.

In one illustrative, non-limiting example, the method of the present invention produced the curves depicted in FIG. 1 for a 36-volt 18 cell, a 220 amp-hour lead acid battery designed for golf cart use. Three of the characteristics of the battery, i.e., the specific gravity which is depicted by curve A, the temperature which is depicted by curve B, and the terminal voltage depicted by curve C as shown in FIG. 1.

In addition to the curves for the three characteristics of the battery, the charge current depicted by curve D is also shown in FIG. 1.

A 36-volt battery designed for golf cart use has an end voltage of approximately 31.5 volts when it is discharged to the point that it will no longer power a golf cart. This is depicted as the starting point for the charging of the battery of FIG. 1.

In producing the curves of FIG. 1, a constant current source was employed which provided a charging current of 25 amperes that was substantially constant during the entire charge program. The specific gravity of the discharged battery measured approximately 1.100 as shown by curve A on FIG. 1. The charging program was started with the battery at substantially room temperature or approximately 72°F, as shown by curve B in FIG. 1. While the 25 amperes was being applied to the battery, the terminal voltage of the battery was monitored. When the terminal voltage reached approximately 2.5 volts per cell or 45 volts for the 36-volt lead acid battery, a timed interval of charge was started. At the 45 volt point, essentially 100 percent of the energy that was removed from the battery has been replaced.

It is thereafter desirable to overcharge the battery. The amount of overcharge selected for the battery under charge in developing the curves of FIG. 1 was approximately 12 percent of the rated capacity. Thus, for a 220 ampere-hour battery, the charge current of 25 amperes is continued for approximately 1½ hours. At the end of this time interval, the charge current is decreased to a trickle charge level which, in the case of the 36-volt lead acid battery for golf cart usage, is less than one-half ampere.

During the fixed interval of charge, the charging rate is advantageously of sufficient magnitude to cause gassing which tends to keep the electrolyte mixed to prevent an adverse discrepancy between the specific gravity at the top and bottom of the electrolyte and possible damage to the separators and plates.

For batteries designed for golf cart use, the 25 ampere high rate charge charges the battery to over 100 percent of the rated capacity in less than six hours for the illustrative 36-volt 220 ampere-hour golf cart battery having the characteristic depicted in FIG. 1. Thus, for a 12-hour period between uses, the battery may remain on trickle charge for at least 6 hours, which trickle charge improves the balance of the cells in the battery.

Figure 2:
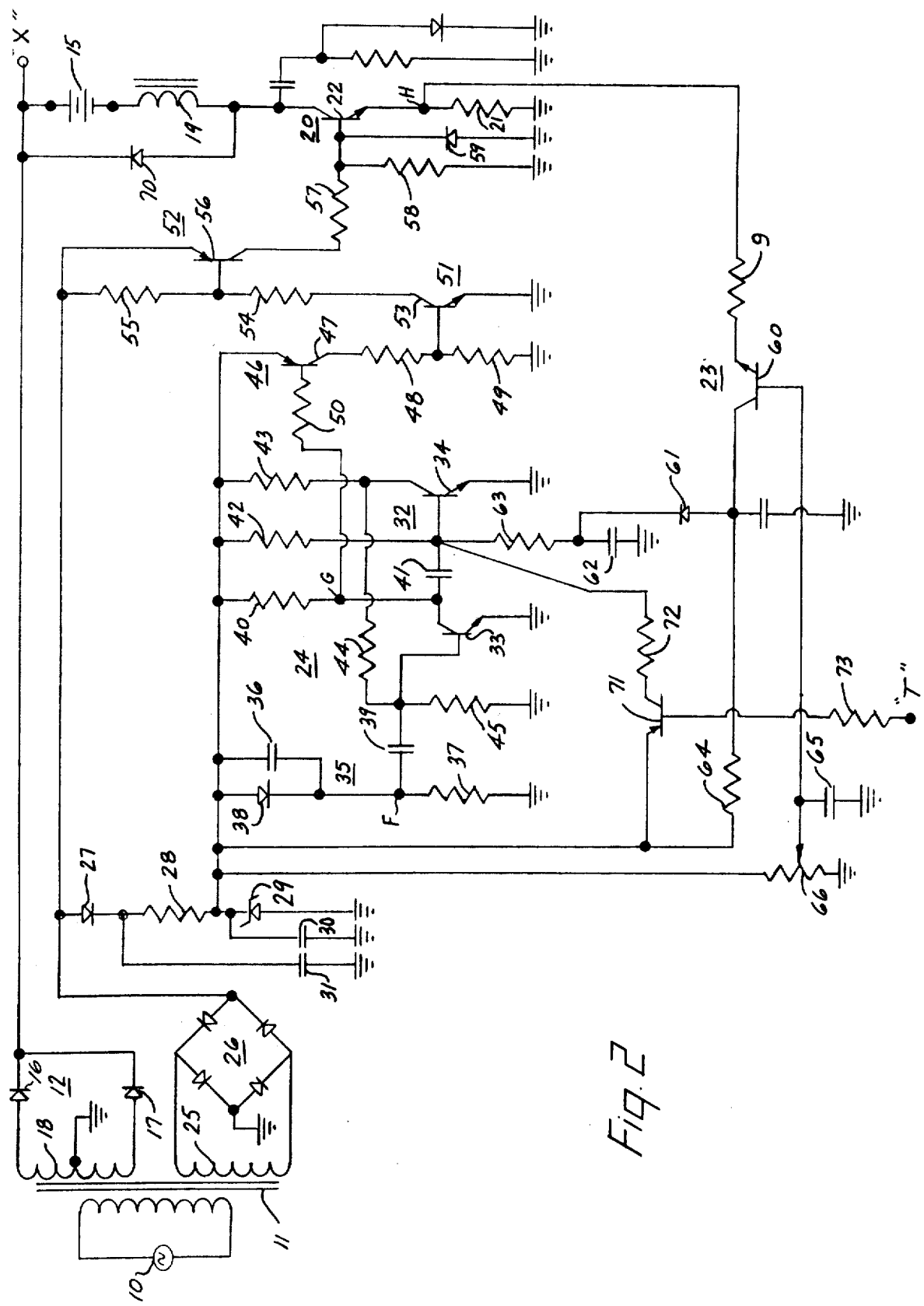
FIG. 2 is a schematic diagram of a battery charging circuit in accordance with the present invention.

A circuit for charging batteries in accordance with the present invention is shown schematically in FIG. 2. The circuit includes a source 10 which may be the commercial 110-volt source available at a wall plug. The charger comprises a transformer 11 for establishing the desired voltage for the battery to be charged and a recitifier 12 for converting the alternating-current voltage to a pulsating direct-current voltage. The output of the full wave rectifier 12 is connected to a battery 15 to be charged.

The positive terminal of the battery 15 is connected to the positive side of the full wave recitifier 12. The rectifier 12 includes a pair of rectifying elements 16 and 17 having a common terminal connected at the positive output of the rectifier 12. The other terminals of the rectifying elements 16 and 17 are connected to opposite ends of a center tapped secondary 18 of the transformer 11. The center tap of the secondary 18 is connected to ground reference. The negative terminal of the battery 15 is connected through an inductor 19, a controllable switch 20, and a current sensing element 21 to ground reference to complete the charge path.

In the charger of FIG. 2 the controllable switch 20 is a transistor 22 having its collector-emitter path connected in the charge current path of the battery 15. The current sensing element is a resistor 21 across which a voltage representative of the charge current is developed. This voltage is coupled through an amplifier 23 to a control circuit 24. The control circuit 24 controls the duty cycle of the switching transistor 22. A separate source of voltage is provided for the amplifier 23 and the control circuit 24 through a second secondary 25 of transformer 11 and a full wave bridge rectifier 26 connected across the secondary 25.

The positive voltage at the output of the rectifier 26 is applied to a voltage divider comprised of a diode 27, a resistor 28, and a Zener diode 29 connected in series. For purposes of illustration, it will be assumed that the battery 15 is a 36-volt 220 amp-hour lead acid battery having 18 cells and designed for use in a golf cart. The 20-hour rate of the battery 15 is approximately 11 amperes and will hereinafter be referred to as the nominal discharge rate of this particular battery.

For this lead acid battery, the peak voltage at the output of secondary 18 is advantageously 70 volts and for the control circuit 24 and amplifier 23 the peak voltage at the output of secondary 25 is advantageously 25½ volts. With 25½ volts peak at the output of secondary 25, and using a 12-volt Zener or Zener diode 29, a regulated voltage of 12 volts appears between resistor 28 and diode 29. This voltage is filtered by a filter capacitor 30 connected across Zener diode 29. The output voltage from rectifier 26 is also filtered by a filter capacitor 31 connected across the series combination of resistor 28 and diode 29.

The duty cycle of the switching transistor 22 is controlled by a one-shot multivibrator 32 having active elements of a transistor 33 and a transistor 34 and their respective resistive and capacitive biasing and interconnecting networks.

The stable state of the multivibrator 32 is with transistor 34 in its "ON" condition and transistor 33 in its "OFF" condition. Conversely, the unstable state is with transistor 33 in its "ON" condition and transistor 34 in its "OFF" condition.

The multivibrator 32 is triggered into its unstable state by a triggering circuit 35 comprised of a capacitor 36 and a resistor 37 connected in series between the regulated 12-volts and ground reference. A switching diode 38 is connected across the capacitor 36. A capacitor 39 couples the trigger pulse from the trigger circuit 35 to the base of transistor 33. The emitter of transistor 33 is connected to ground reference while the collector is connected through a resistor 40 to the regulated supply.

The collector of transistor 33 is also connected through a capacitor 41 to the base of transistor 34. The base of transistor 34 is connected through a resistor 42 to the regulated supply while the collector of resistor 34 is connected through a resistor 43 to the regulated supply. The emitter of transistor 34 is connected to ground reference. The collector of transistor 34 is coupled to the base of transistor 33 through a resistor 44. The base of transistor 33 is also coupled to ground reference through a resistor 45.

The unstable state of multivibrator 32 is sensed by an amplifier 46 having an active element of a transistor 47. The emitter of transistor 47 is connected to the regulated supply while the collector is connected through series connected resistors 48 and 49 to ground reference. The base of amplifier 46 is coupled through a resistor 50 to the collector of transistor 33 in the multivibrator circuit 32. The output of amplifier 46 is coupled through an amplifier 51 to a power amplifier 52. Amplifier 51 includes a transistor 53 having its base connected to the junction of resistors 48 and 49, its emitter connected to ground reference, and its collector connected through series connected resistors 54 and 55 to the output of rectifier 26. Power amplifier 52 includes a transistor 56 having its base connected to the junction of resistors 54 and 55, its emitter connected to the output of rectifier 26, and its collector connected through a resistor 57 to the base of switching transistor 22. The bias circuit for switching transistor 22 also includes a resistor 58 connected between the base and ground reference and a diode 59 connected between the base and ground reference.

The unstable state of the multivibrator 32 in the control circuit 24 is of variable duration through the action of amplifier 23 which couples the variation in charge current to the multivibrator 32. Amplifier 23 includes a transistor 60 having its emitter connected through a resistor 61 to the emitter of switching transistor 22 for sensing the charge current through resistor 21. The collector of transistor 60 is connected through a rectifying diode 61 and a storage capacitor 62 in series to ground reference. The junction of diode 61 and capacitor 62 is connected through a resistor 63 to one side of the timing capacitor 41 and to the base of transistor 34 in multivibrator 32. The collector of transistor 60 is also connected through a resistor 64 to the regulated voltage. The base of transistor 60 is connected through a capacitor 65 to ground reference and to the variable arm of a potentiometer 66 which is connected between the regulated voltage and ground reference. Potentiometer 66 provides an adjustment whereby the desired charge current level may be established.

The charger of FIG. 2 has an additional feature not normally present in battery charging circuits in that the energy stored in the inductor 19 is put into the battery 15 each time charging current is interrupted. For this purpose, a diode 70 is connected across the battery 15 and inductor 19 with the cathode being connected to one end of the inductor and the anode being connected to the positive terminal of the battery 15.

The battery charger of FIG. 2 provides constant current charging for the battery 15 through the action of current sensor 21, amplifier 23 and control circuit 24. The operation of the constant current charging circuit of FIG. 2 may be understood more easily by reference to the voltage waveforms of FIG. 3 that appear at various points in the charging cathode of FIG. 2.

Figure 3:
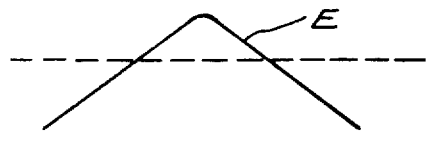
FIG. 3 is a time-based chart depicting the voltage waveforms at various points in the circuit of FIG. 2 that are useful in understanding the operation of the circuit.

Curve E of FIG. 3 is representative at one-half cycle of the voltage across secondary 18 of transformer 11. It is assumed that the source 10 has a 60-hertz frequency and that one-half cycle has a period of approximately 8.3 milliseconds. The trigger circuit 35 has a repetition rate of 1 kilohertz and therefore produces a pulse every millisecond, as depicted by the pulses of curve in F in FIG. 3.

The waveform of the voltage appearing at the collector of transistor 33 and multivibrator 32 which represents the unstable state of the multivibrator 32 is representatively shown by curve G in FIG. 3. The duty cycle of the switching transistor 22 is illustrated by the voltage developed across resistor 21 by the charge current that flows therethrough. The voltage developed across resistor 21 is representatively shown by curve H in FIG. 3.

For converting to trickle charge, a portion of the regulated voltage appearing at the top of Zener diode 29 is applied through a transistor 71 to the timing capacitor 41 and the base of transistor 34. The base of transistor 71 is connected through a resistor 73 to a terminal point T. For converting to trickle charge, ground reference is applied to point T.

In operation, constant current is supplied to the battery 15 by the charging circuit of FIG. 2 in the following manner:

When the supply voltage, as representatively shown by curve E in FIG. 3, increases above the battery terminal voltage, represented by the dashed line through curve E in FIG. 3, charge current may flow. If switching transistor 22 is in the "ON" condition, charge current will flow into the battery 15 and through the indicator 19, switching transistor 22, and resistor 21. The current will start at 0 amperes each time by the action of the inductor 19. The charge current is representatively shown by the voltage curve H in FIG. 3. The saw-tooth waveform voltage at point H is sensed and amplified by amplifier 23. The output of amplifier 23 is applied through the rectifying diode 61 to the capacitor 62. As the charge current increases through the battery 15, which increase is sensed by the resistor 21, the voltage on the capacitor 62 will be increased. This voltage increase causes the unstable state of the multivibrator 32 to decrease, which decreases the "ON" time of the switching transistor 22, with a resultant decrease in charge current.

Conversely, as the charge current decreases, the voltage on the capacitor 62 also decreases, thereby increasing the duration of the unstable state to increase the "ON" time of the switching transistor 22.

The switching transistor has a bias applied to its base that is sufficient to turn it on if the source voltage is greater than the voltage of the battery being charged. This bias is applied at a rate determined by the triggering circuit 35. This rate may be increased above the 1 kilohertz assumed rate or it may be decreased below this rate. The higher the rate, the more often the charge current is sampled and the more closely the current can be controlled.

Figure 4:
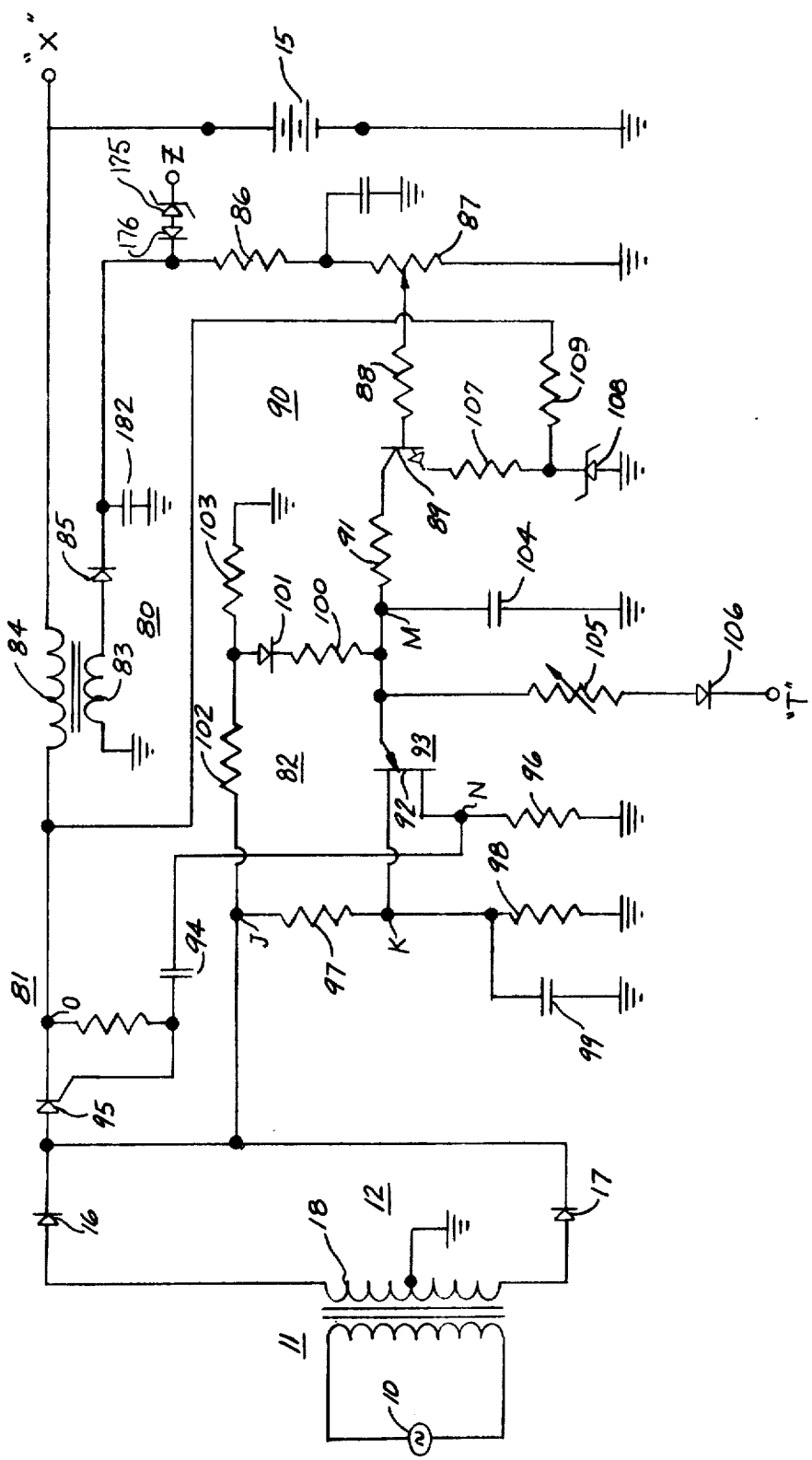
FIG. 4 is a schematic diagram of an alternative embodiment of a battery charging circuit in accordance with the present invention.

An alternative embodiment for a constant current charger is shown in FIG. 4. The components that are common to the circuits of FIGS. 2 and 4 have the same reference numbers in the two circuits. The circuit of FIG. 4 has the same basic components as those in the circuit of FIG. 2. The charger of FIG. 4 includes a current sensor 80, a controllable switch 81, and a control circuit 82. The current sensor 80 includes a transformer winding 83 magnetically coupled to an inductor 84 that is in the change current path. One side of winding 83 is connected to ground reference while the other side is connected through a diode 85, a resistor 86, and a potentiometer 87 to ground reference.

The movable arm of potentiometer 87 is connected to the control circuit 82 by being connected through a rectifier 88 to the base of a transistor 89 which is the active element of an amplifier 50. The emitter of transistor 89 is connected through a resistor 107 and a Zener diode 108 in series to ground reference. A resistor 109 is connected between the junction of the resistor 107 and the Zener diode 108 and the power supply side of inductor 84. Resistors 107 and 109 and Zener diode 108, combined, provide temperature compensation in the control circuit 82. The collector of transistor 89 is connected through a resistor 91 to the emitter of a unijunction transistor 92. The unijunction transistor 92 forms the active element of a relaxation oscillator 93. One base of the unijunction transistor 92 is connected through a capacitor 94 to the gate of a SCR 95 which forms the controllable switching component of the controllable switch 81.

The lower base of the unijunction transistor 92 is also connected through a resistor 96 to ground reference. The upper base of unijunction transistor 92 is connected to a junction of a resistor 97 connected in series with a resistor 98 between the positive output of the rectifier 12 and ground reference. A capacitor 99 is connected across resistor 98. A selected voltage is applied to the emitter of unijunction transistor 92 through a resistor 100, diode 101, and the voltage divider of resistors 102 and 103 connected between the positive output of the rectifier 12 and ground reference. The timing capacitor for the relaxation oscillator 93 is a capacitor 104 connected between the emitter of the unijunction transistor 92 and ground reference.

A circuit for converting to trickle charge at the end of the timed interval comprisess a variable resistor 105, connected through a diode 106 to a terminal point T which is connected to ground reference when it is desired to convert to the trickle charge. One side of variable resistor 105 is connected to the emitter of unijunction transistor 92. The control circuit 82 provides phase angle control of the firing angle of the SCR 110 essentially between 0°–180° of each half cycle of the voltage across secondary 18 of the transformer 11.

Figure 5:
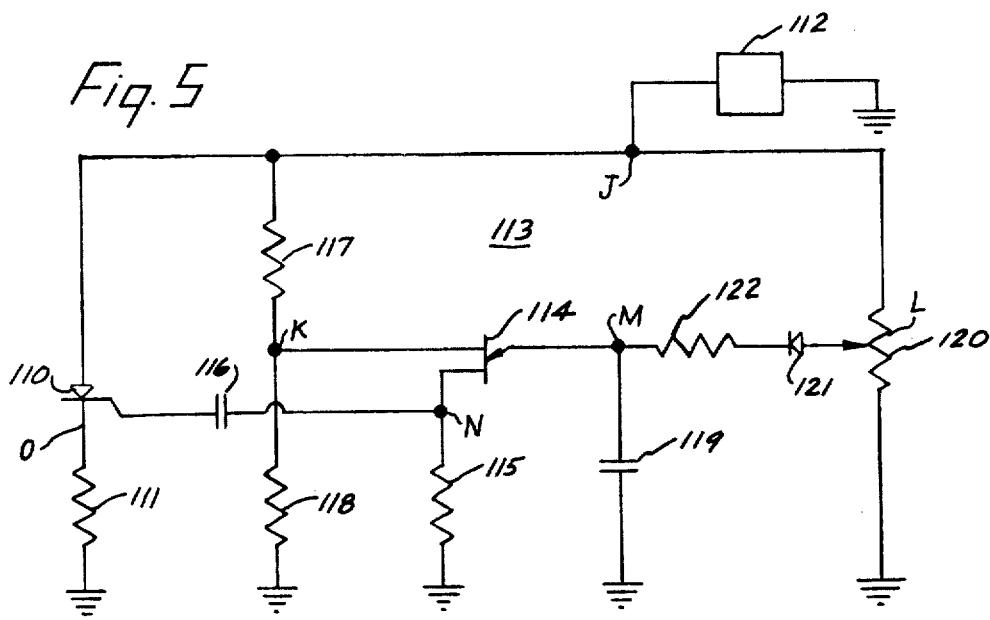
FIG. 5 is a schematic diagram of a silicon controlled rectifier control circuit useful in the charging circuit of FIG. 4.

The operation of the controllable switch 81 and the control circuit 82 may be understood more easily by reference to FIG. 5 and the curves of FIg. 6. For purposes of illustration, it is assumed that a SCR 110 is connected as a controllable switch between a load 111, which may be a battery under charge, and a source of pulsating direct-current voltage 112. The firing angle of the SCR 110 is controlled by control circuit 113 which includes a unijunction transistor 114 having its lower base connected through a rectifier 115 to ground reference and connected through a capacitor 116 to the gate of the SCR 110.

The upper beam of unijunction transistor 114 is connected to the junction of a voltage divider comprised of a resistor 117 connected in series with a resistor 118 between the output of source 112 and ground reference. A timing capacitor 119 is connected between the emitter of the unijunction transistor 114 and ground reference. A single control for controlling the firing angle of the SCR 110 through the control circuit 113 is provided by a potentiometer 120 which is connected between the output of source 112 and ground reference. The variable arm of potentiometer 120 is connected through diode 121 and resistor 122 to the emitter of the unijunction transistor 114. The waveforms of the voltage and signals appearing at various points within the circuit of FIG. 5 are shown in FIGS. 6A, 6B, 6C, and 6D. Initially it is assumed that the variable arm of the potentiometer 120 is set near ground reference so that a small voltage, representatively shown by curve L in FIG. 6A, appears at point L. For purposes of illustration, it is assumed that the peak voltage at point J is 70 volts and that the voltage divider network of resistors 117 and 118 causes a peak voltage of 40 volts to appear at point K which is connected to the upper base of the unijunction transistor 114.

With 70 volts peak appearing at point J, the voltage appearing at point L may vary anywhere between 0–70 volts peak. For proper operation of the circuit of FIG. 5, the time constant of the portion of potentiometer 120 above point L and the resistor 122 and capacitor 119 must be less than 5 percent of the period of the pulsating source. Assuming the source has a frequency of 60 Hertz, then the period of the source will be 8⅓ milliseconds and the time constant of the resistors 120 and 122 and the capacitor 119 should be less than 42 microseconds if control between 0°–180° is desired. For the firing of the unijunction transistor 114, the voltage at the emitter must be at least .65 times the voltage on the upper base of the unijunction transistor 114.

It is assumed that the voltage on the upper base of unijunction transistor 114 has the waveform shown by curve K and a peak voltage of 40 volts. Under these conditions and with a peak voltage of less than 40 volts on the emitter, the SCR 110 can only fire in the latter half of the waveform of curve J, i.e., between 90°–180°.

Assuming a peak voltage of approximately 10 volts at point L, the SCR 110 will not fire until approximately 160° of the input cycle from source 112, as shown in the curves of FIG. 6A. With 10 volts at point L, capacitor 119 will attempt to charge to this peak voltage, as shown by curve M in FIG. 6A. As the input voltage passes through its peak and the voltage at point L decreases from the 10-volt peak, the charge on capacitor 119 will remain constant because of the diode 121 preventing any leakage from the capacitor 119. Thereafter, when the voltage at point K becomes less than approximately 1.54 times the voltage across capacitor 119 the unijunction transistor 114 will conduct. At this point the unijunction transistor 114 will conduct and capacitor 119 will discharge through the emitter lower base junction and resistor 115. The resultant pulse produced across resistor 115, as shown by curve N in FIG. 6B, will be coupled through capacitor 116 to the gate of SCR 110 to turn the rectifier on.

As the voltage at point L is increased, as shown by the curves in FIGS. 6B, 6C, and 6D, the SCR 10 will fire earlier and earlier in the half cycle of the input waveform until the voltage is increased to its maximum where the SCR will then fire near the 0° point.

The single control of potentiometer 120 of FIG. 5 is replaced by an equivalent circuit in the charger of FIG. 4. In the circuit of FIG. 4, transistor 89 acts like a variable resistor across the timing capacitor 104 for control of the firing angle of the SCR 95, in response to variations in the charge current which are sensed by the charge current sensor 80. As the charge current increases, for example, a larger positive voltage with respect to ground reference will appear at the base of transistor 89. This increase in voltage will cause the transistor 89 to conduct more, thereby presenting a lower resistance and a lower peak voltage across the timing capacitor 104. This lower voltage will cause an increase in the firing angle of the SCR 95, thereby decreasing its "ON" time to decrease the charge current applied to the battery. In this way, the charge current is held substantially constant during the charging of the battery.

Where the state of charge of the battery to be charged is known the charge program may simply consist of the application of a high rate charge current, i.e., a rate in excess of the nominal discharge rate employed in rating the battery, or alternatively applying a charge current at a potential above the decomposition potential of the electrolyte, for an interval of time sufficient to charge the battery and to provide the desired overcharge.

A method useful no matter what the initial state of charge of the battery to be charged includes the step of monitoring a characteristic of the battery during a first charge interval and upon the attainment of a preselected level of the monitored characteristic, continuing the application of a high rate charge current for a second interval of time having a duration dependent upon the length of the first interval of time. Alternatively, the second interval may be fixed based upon the energy removed from the battery during discharge and the amount of overcharge desired or based upon the rated capacity of the battery. The rate of charge current during the second interval may be equal to, greater than, or less than the charge current applied to the battery before the timed interval is begun.

Figure 7:
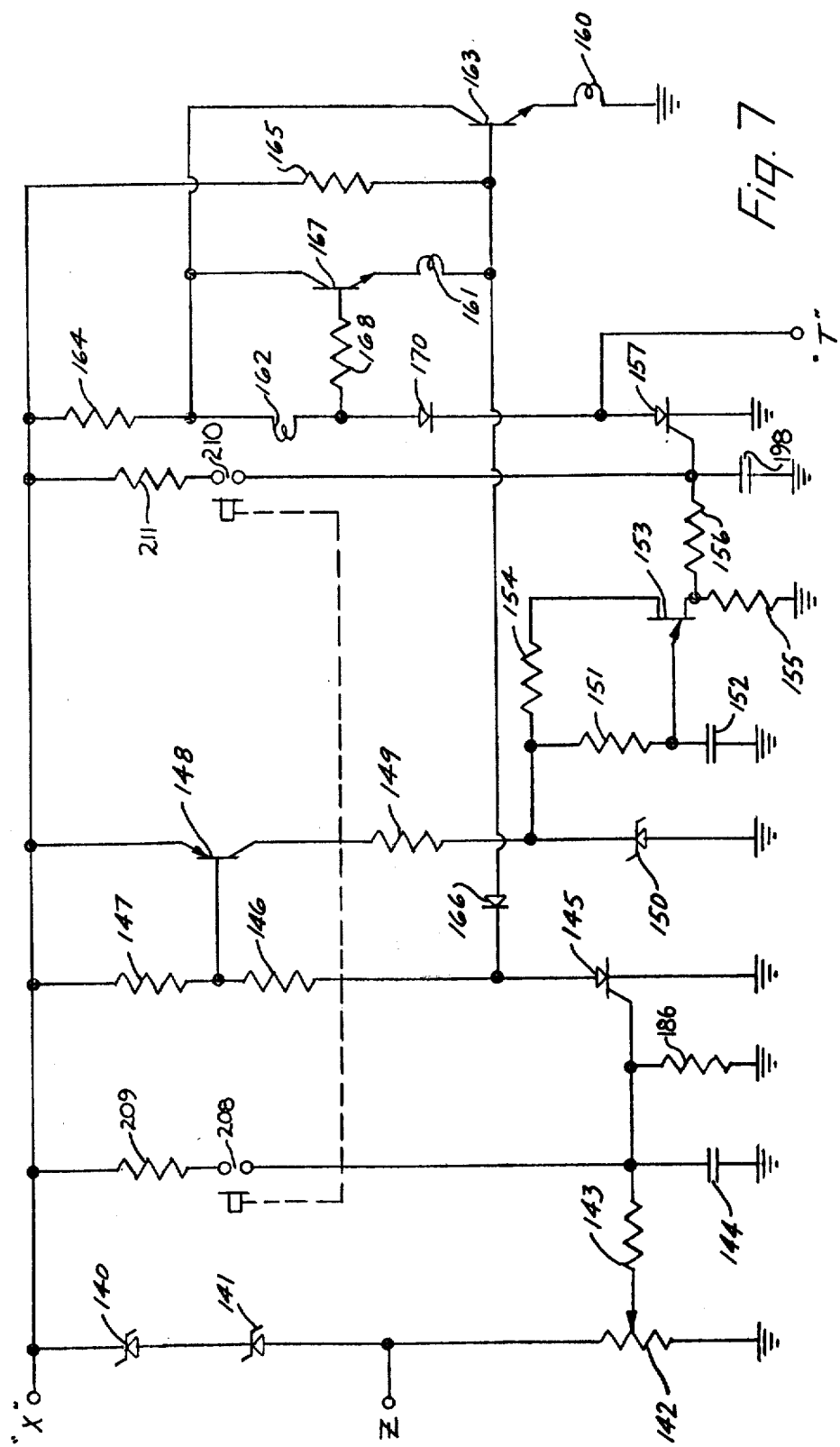
FIG. 7 is a schematic diagram of a circuit for applying a charging current for a timed interval in accordance with the present invention that may be used with the charging circuits of either FIG. 2 or FIG. 4.

A circuit for monitoring the terminal voltage of the battery and for providing a timed interval is shown in schematic form in FIG. 7. This circuit may be employed with various charge current circuits such as the constant current charger of FIG. 2 or the constant current charger of FIG. 4.

For connecting the circuit of FIG. 7 to the circuit of FIG. 2, the terminal points marked "X" in FIG. 2 and FIG. 7 and the terminal points marked "T" in FIG. 2 and FIG. 7 are connected together. By connecting the terminal points X together, the terminal voltage of the battery 15 will appear at the input to the circuit of FIG. 7. The monitoring portion of the circuit of FIG. 7 comprises a pair of Zener diodes 140 and 141 connected in series with a potentiometer 142 between terminal point X and ground reference. The variable arm of potentiometer 142 is connected through a resistor 143 and a capacitor 144 to ground reference. The junction point of resistor 143 and capacitor 144 is connected to the gate of a SCR 145. The cathode of the SCR 145 is connected to ground reference while the anode is connected through a pair of voltage divider resistors 146 and 147 connected in series to the terminal point X. The timing portion of the circuit of FIG. 7 comprises a transistor 148 that is responsive to the conduction state of the SCR 145. The base of transistor 148 is connected to the junction of resistors 146 and 147 in the anode circuit of silicon controlled rectifier 145. The emitter of transistor 148 is connected to the X terminal point while the collector is connected through a resistor 149 and a Zener diode 150 in series to ground reference.

The timing portion also includes a timing network of a resistor 151 and a capacitor 152 in series connected across the Zener diode 150. The junction of the resistor 151 and capacitor 152 is connected to an emitter of a unijunction transistor 153 which is responsive to the voltage across capacitor 152. The upper base of the unijunction transistor 153 is connected through a resistor 154 to the regulated voltage at the top of Zener diode 150. The lower base of unijunction transistor 153 is connected through a resistor 155 to ground reference and also through a resistor 156 to the gate of a SCR 157. The timing portion of the circuit of FIG. 7 controls the operation of SCR 157 which acts as a switch to apply ground reference to terminal point T, which terminal point is connected to the anode of the SCR 157.

The circuit of FIG. 7 also inclulded an indicating portion with lights that may be mounted on a panel of the charger to indicate the state of operation of the charger. A first light 160 indicates that the charger is in its initial state or first mode when lit. A light 161 indicates that the charger is in the timed interval or second mode when lit, and a light 162 indicates that the charger is in the trickle charge mode or that the high rate charging has been completed, when lit. Light 169 is connected between ground reference and the X terminal point through the emitter-collector path of a transistor 163 and a resistor 164. The emitter of transistor 163 is connected to one side of light 160 while the collector of transistor 163 is connected through resistor 164 to the X terminal point. The bias for transistor 163 is provided through a resistor 165 which is connected between the base of transistor 163 and the X terminal point. The base of transistor 163 is also connected between a diode 166 to the anode of SCR 145.

Light 161 is connected to ground reference through the diode 166 and SCR 145 and to the X terminal point through the emitter-collector path of a transistor 167 and the resistor 164. The emitter of transistor 167 is connected to one side of the light 161 while the collector of transistor 167 is connected to the X terminal point through resistor 164.

The biasing for transistor 167 is provided through a resistor 168, light 162 and resistor 164 which are connected in series to the base of transistor 167.

Resistor 168 is connected directly between the base of transistor 167 and one side of light 162. The other side of light 162 is connected to the X terminal point through resistor 164.

The current path for light 162 for illumination of this light is between the X terminal point and ground reference through resistor 164, a diode 170, and SCR 157. Diode 170 is connected between the junction of resistor 168 and light 162 and the anode of SCR 157.

For the 36-volt 18 cell 220 amp-hour battery designed for golf cart use, discussed in connection with the curves of FIG. 1 and the charger of FIG. 2, a terminal voltage slightly in excess of the hard gassing point may advantageously be employed for starting the timed interval. For a 36-volt 18 cell lead acid battery, the hard gassing point, according to the Vinal text, page 262, occurs a terminal voltage of 45 volts. Thus, in the circuit of FIG. 7, the Zener diodes 140, 141 are selected and the movable arm of potentiometer 142 is adjusted so that a terminal voltage slightly in excess of 45 volts or the hard gassing point starts the timed interval.

Assume, for example, that the prescribed level of terminal voltage to cause the start of the timed interval is 47 volts. When the battery voltage reaches 47 volts as charge progresses, SCR 145 will be turned on to apply substantially ground reference to the bottom of the voltage divider of resistors 146 and 147. Current can then flow through the resistors 146 and 147 whereby a negative voltage with respect to the emitter of transistor 148 will be applied to the base of transistor 148. Transistor 148 will be turned on and current will flow through transistor 148, resistor 149 into the timing circuit of resistor 151 and capacitor 152. The Zener diode 150 will establish a stabilized voltage across the timing circuit of resistor 151 and capacitor 152. The time constant of resistor 151 and capacitor 152 is selected to provide the preselected interval during which the application of high rate charge to the battery is continued.

At the end of the preselected interval, the charge on the capacitor 152 will cause the unijunction transistor 153 to conduct. Thereupon, the capacitor 152 will discharge through the emitterlower base junction of unijunction transistor 153 and resistor 155. The voltage appearing across resistor 155 will gate "ON" SCR 157 to apply substantially ground reference to terminal point T.

In the circuit of FIG. 2 with essentially ground reference appearing at terminal point T, transistor 71 will be turned on so that a relatively high voltage will be applied at the junction of capacitor 41 and the base of transistor 34 in the multivibrator 32 of the control circuit 24. The appearance of this constant relatively high voltage at this junction will decrease the duration of the unstable state of the mulvibrator 32 to a preselected small value. With the unstable state of the multivibrator 32 having a very small duration, the switching transistor 22 will be on for only a very short interval of time for each trigger pulse from trigger circuit 35. This short duty cycle for switching transistor 32 will substantially reduce the charge current rate to a selected trickle charge level.

In the operation of the indicating lights or lamps, the sensing of the preselected level of the monitored characteristic which turns on SCR 145 will apply essentially ground reference to the base of transistor 163 to turn off this transistor and shut off light 160. The application of ground reference through SCR 145 will provide a conduction path through transistor 167 for light 161 to indicate the beginning of the timed interval. At the end of the timed interval and upon the turning on of SCR 157, transistor 167 will be shut off and a current path will be provided for light 162 to indicate that high rate charging has been terminated.

In employing the circuit of FIG. 7 with the constant current of FIG. 4, the terminal points X and T of the charger are respectively connected to the terminals X and T of the timing circuit. Upon the end of the timed interval and the conduction of SCR 157, essentially ground reference is applied to terminal point T.

The variable resistor 105 is set at the desired resistive value so that the voltage across capacitor 104 is held at a relatively low level. This low voltage across the capacitor 104 which is applied to the emitter of unijunction transistor 92 will cause the SCR 95 to fire near the 180° point, thereby substantially reducing the "ON" time and converting to a trickle charge level.

It is desirable to preclude the high rate charging current from flowing in the charger when a battery is not connected to the charger.

For this purpose, a Zener diode 175 and a diode 176 are connected between terminal Z and the junction of resistor 86 and diode 85 in the charging circuit of FIG. 4. Terminal Z is connected to a means for sensing the voltage between the output terminal X of the charger and ground reference. When employing the circuit of FIG. 7, terminal Z may be taken from the junction between Zener diode 141 and potentiometer 142.

When there is no battery connected between terminal X and ground reference the voltage across the resistor 142 will be higher than normal. The Zener diode 175 has a breakdown voltage that is higher than the voltage that normally appears across resistor 142 when a battery is connected between terminal X and ground reference. Thus, when there is no battery connected and the voltage across resistor 142 exceeds a preselected value, current will flow through Zener diode 175 and diode 176 and will charge capacitor 182.

Additionally, current will flow through resistors 86 and 87 which will cause the transistor 89 to conduct more, thereby presenting a lower voltage across timing capacitor 104. The charge on capacitor 182 causes the conduction through transistor 89 to be high enough to hold the firing angle of SCR 95 near the 180° point, thereby preventing the high rate curent flow. The charge on the capacitor 182 periodically leaks off so that high rate current flows for a short period of time to recharge the capacitor which again brings the firing angle of the SCR 95 near the 180° point and holds the charger in its low current state.

Rather than employing a second interval of fixed duration, the second interval may be of variable duration and dependent upon the duration of the first interval. A circuit for accomplishing this is shown in schematic form in FIG. 8. The circuit of FIG. 8, similar to the circuit of FIG. 7, may be employed with various charge current circuits such as the constant current charger of FIG. 2 or the constant current charger of FIG. 4.

Figure 8:
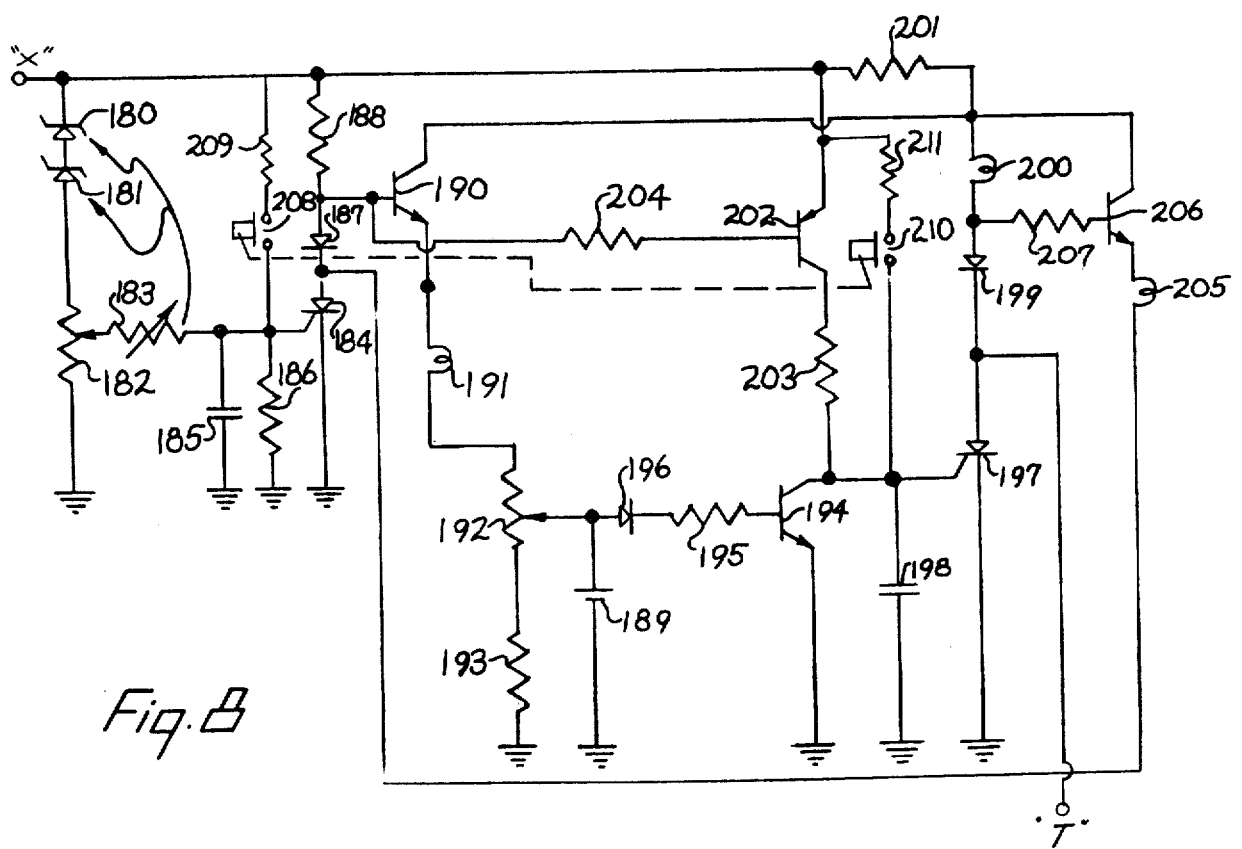
FIG. 8 is a schematic diagram of a circuit for applying charge current for a second interval, wherein the second interval is dependent on the duration of the first interval in accordance with this invention.

The circuit of FIG. 8 monitors the battery terminal voltage for terminating the first interval and beginning the second interval upon the attainment of a preselected voltage across the battery under charge. The circuit of FIG. 8 is connected to the corresponding terminals X and T of the circuit of FIG. 2 or FIG. 4 in the same manner as the circuit of FIG. 7.

The monitoring portion of the circuit of FIG. 8 comprises a pair of Zener diodes 180 and 181 connected in series with a potentiometer 182 between terminal point X and ground reference. The variable arm of potentiometer 182 is connected through a thermistor 183 to the gate of a SCR 184. A capacitor 185 and a resistor 186 are connected in parallel between the gate of SCR 184 and ground reference. The cathode of SCR 184 is connected to ground reference while the anode is connected through a diode 187 and a resistor 188 in series to the terminal point X.

The primary element of the timing portion of the circuit of FIG. 8 is a single cell 189. Advantageously, this single cell 189 is a nickel cadmium cell having known characteristics of charge and discharge so that the period of discharge to a selected end voltage may be dependent upon the duration of the charge interval. The cell 189 is charged through a transistor 190 and a voltage divider network connected between the emitter of transistor 190 and ground reference.

The voltage divider network comprises a light 191, a potentiometer 192, and a resistor 193 connected in series between the emitter of transistor 190 and ground reference. The positive terminal of the cell 189 is connected to the variable arm of the potentiometer 192. The terminal voltage of the cell 189 is sensed by and controls the operation of a transistor 194. The base of transistor 194 is connected to the positive terminal of cell 189 through a resistor 195 and a diode 196. The emitter of transistor 194 is connected to ground reference while the collector is connected to the gate of a SCR 197.

A spurious voltage bypass capacitor 198 is connected between the gate of SCR 197 and ground reference. The cathode of SCR 197 is connected directly to ground reference while the anode is connected through a diode 199 and a light 200 to the collector of transistor 190. The junction of the collector of transistor 190 and light 200 is connected through a current limiting resistor 201 to terminal X.

Trigger current for SCR 197 is provided through a transistor 202. The collector of transistor 202 is connected through a resistor 203 to the gate of SCR 197. The emitter of transistor 202 is connected to terminal X while the base of transistor 202 is connected through a resistor 204 to the junction of diode 187 and resistor 188 so that the conduction state of transistor 202 is determined by the conductive state of SCR 184.

The circuit of FIG. 8 also includes an indicating portion with lights that may be mounted on a panel of the charger to indicate the state of operation of the charger. Light 191 is a part of the indicating portion and indicates, when lit, that the charger is in its initial state or first mode of the charging program. A light 205 indicates, when lit, that the charger is in the second interval or mode of the charging program, and a light 200, when lit, indicates when the charger is in the trickle charge mode or that the high rate charging has been completed.

Light 205 is connected between the anode of SCR 184 and terminal X through a transistor 206 and current limiting resistor 201. The emitter of transistor 206 is connected to light 205 while the collector of transistor 206 is connected to terminal X through resistor 201. The base of transistor 206 is connected through a resistor 207 to the junction between light 200 and diode 199.

In operation, the terminal voltage of the battery under charge is applied to the voltage divider network of Zener diodes 180 and 181 and potentiometer 182. At a preselected level of battery terminal voltage, such as the hard gassing point of 45 volts for a 36-volt lead acid battery, the SCR 184 is turned on. Previous to the turning on of SCR 184 there is current flow through transistor 190 and light 191, potentiometer 192, and resistor 193. Light 191 is thus lit, indicating that the charger is in the first mode of the charge program. The current flow through transistor 190 will also charge the cell 189.

The charging of cell 189 will continue until the selected terminal voltage is attained and SCR 184 is turned on. The turning on of SCR 184 shuts off transistor 190 and turns on transistor 202. Transistor 202 applies a trigger current to the SCR 197. However, this trigger current is bypassed around the gate-cathode junction of SCR 197 by transistor 194. Transistor 194 remains on so long as the terminal voltage of the cell 189 is above the two diode drops of diode 196 and base-emitter junction of transistor 194. The interval of time that it takes for the voltage of cell 189 to drop below this sustaining voltage is determined by the state of charge of cell 189 attained while charging current is flowing during the first mode of the charge program. Thus, the duration of the second interval of the charge program is dependent upon the duration of the first interval of the charge program.

At the termination of the first interval or first mode of the charge program where SCR 184 turns on, current flows through transistor 206 and light 205 to indicate that the charger is in the second mode of the charge program. Light 205 remains on until SCR 197 fires which causes light 200 to turn on and removes the bias for transistor 206 to turn light 205 off. The turning on of light 200 indicates that the high current charging has been completed and that the charger is in the trickle charge mode or that no further charge current is being applied to the battery.

The charger is put in the trickle charge mode by the application of ground reference to terminal T upon the turning on of SCR 197. The charger may be put into the trickle charge mode manually if desired. For this purpose, a switch 208 is connected between the gate of SCR 184 and terminal X through a resistor 209. A second switch 210, which may be mechanically coupled to the switch 208, is connected between the gate of SCR 197 and terminal X through a resistor 211. The closing of the switches 208 and 210 applies significant trigger current to the SCR's 184 and 197 to turn them on which will place the charger in the trickle mode.

An additional feature of the circuit of FIG. 8 is the temperature compensation provided by the thermistor 183. Thermistor 183 is placed in thermal contact with the Zener diodes 180 and 181 so that the SCR 184 will turn on when the preselected battery terminal voltage is attained independent of the temperature of the charger. The Zener diodes 180 and 181 are sensitive to temperature and have a positive temperature coefficient such that an increase in the ambient temperature of the charger causes a lower voltage to appear at the variable arm of potentiometer 182. Thus, it would require a higher battery terminal voltage to turn on SCR 184 for higher ambient temperatures of the charger.

However, the thermistor has a negative temperature coefficient and when placed in thermal contact with Zener diodes 180 and 181 it presents a lower resistance between the variable arm of potentiometer 182 and the gate of SCR 184. This lower resistance causes a greater voltage drop to appear across resistor 186 so that more of the voltage that appears between the variable arm of potentiometer 182 and ground reference is applied to the gate of SCR 184 for higher ambient temperatures of the charger. The reverse is true for lower ambient temperatures. As a consequence, the SCR 184 is caused to fire at substantially the same battery terminal voltage for all ambient temperatures of the charger.

Various modifications may be made in the details of the circuits without departing from the spirit and scope of this invention which is defined by the appended claims.

What is claimed is:

1. A method of charging a lead acid battery comprising the steps of applying a charging current for a first interval of time at a rate sufficient to cause gassing as charge progresses and to reach the hard gassing point for the battery; monitoring the battery terminal voltage; and upon attaining the battery terminal voltage corresponding to the hard gassing point of the battery contuining the application of charging current for a second interval of time having a duration dependent upon the duration of the first interval of time at a rate sufficient to maintain the battery terminal voltage above the decomposition potential of the electrolyte.

2. A method of charging in accordance with claim 1 wherein the second interval of time is less than 30% of the first interval of time.

3. A method of charging in accordance with claim 1 wherein the second interval of time is between 10% and 30% of the first interval of time.

4. A method of charging in accordance with claim 1 wherein the duration of the second interval of time multiplied by the current level during the second interval is a selected percentage of the rated capacity of the battery.

5. A circuit for charging a battery comprising
a constant current source,
circuit means for connecting the source to a battery to be charged,
circuit means for monitoring the terminal voltage of the battery under charge during a first interval of charge,
means responsive to the attainment of a preselected terminal voltage for starting a second interval of charge,
means for determining the duration of the first interval and for limiting the duration of the second interval to a preselected percentage of the duration of the first interval,
the monitoring means comprises a voltage divider network connected across the battery, the network comprising at least one Zener diode in series with a potentiometer; the responsive means comprises a first silicon controlled rectifier having its gate connected to the movable arm of the potentiometer, its cathode connected to the negative terminal of the battery and its anode connected to the positive terminal of the battery through a current limiting resistor, and a NPN transistor switch for connecting the determining and limiting means to the battery under charge during the first interval, the base of the transistor being connected to the anode of the first silicon controlled rectifier, the emitter being connected to the determining and limiting means through a second current limiting resistor and the collector being connected to the positive terminal of the battery; and the determining and limiting means comprises one or more electrochemical cells charged during the first interval through the NPN transistor and discharged during the second interval through a diode and the base-emitter junction of a second NPN transistor switch, the base of the second transistor being connected to the positive terminal of the cell through a diode, the emitter of the second transistor being connected to the negative terminal of the cell and the battery under charge in common, a second silicon controlled rectifier controlled by the conduction state of the second transistor and the conduction state of a PNP transistor switch, the base of the PNP transistor being connected to the anode of the first silicon controlled rectifier, the collector of the PNP transistor being connected through a current limiting resistor to the gate of the second silicon controlled rectifier, the emitter of the PNP transistor being connected to the positive terminal of the battery under charge, the anode of the second silicon controlled rectifier being connected to the positive terminal of the battery through a current limiting resistor, the cathode of the second silicon controlled rectifier being connected to the negative terminal of the battery, and circuit means connected between the anode of the second silicon controlled rectifier and the source for reducing the current to a trickle charge upon the firing of the second silicon controlled rectifier.

6. A battery charging circuit in accordance with claim 5 further comprising means responsive to the ambient temperature of the charging circuit for making the starting means responsive to the preselected terminal voltage irrespective of the temperature of the charging circuit.

* * * * *